United States Patent
Kawamura et al.

(10) Patent No.: US 6,387,506 B1
(45) Date of Patent: *May 14, 2002

(54) RESIN COMPOSITION FOR PAPER-COATING, COATING COMPOSITION FOR PAPER AND COATED PAPER

(75) Inventors: Akira Kawamura; Akira Tanikawa, both of Toyonaka; Toshiyuki Hasegawa, Nara; Yutaka Shibata, Minoo; Toshishige Hamaguchi, Ibaraki, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/450,374

(22) Filed: Nov. 26, 1999

Related U.S. Application Data

(63) Continuation-in-part of application No. 09/139,638, filed on Aug. 25, 1998, now Pat. No. 6,039,799.

(30) Foreign Application Priority Data

| Aug. 26, 1997 | (JP) | 09-229264 |
| Aug. 4, 1998 | (JP) | 10-220667 |
| Nov. 30, 1998 | (JP) | 10-339443 |

(51) Int. Cl.$^7$ .............................. B32B 27/38
(52) U.S. Cl. ................... 428/413; 428/537.5; 523/404; 523/414; 523/415; 523/416; 523/417; 523/420; 525/523
(58) Field of Search ................ 523/404, 414, 523/415, 416, 417, 420, 428; 525/523; 428/342, 413, 537.5; 162/164.3

(56) References Cited

U.S. PATENT DOCUMENTS 5,744,001 A * 4/1998 Linhart ..................... 162/164.3
6,039,799 A * 3/2000 Kawamura ............... 106/287.2

FOREIGN PATENT DOCUMENTS

| JP | 0834879 | 2/1996 | |
| JP | 0860598 | 3/1996 | |
| JP | 1077599 | 3/1998 | |
| WO | 94/20681 | * | 9/1994 |
| WO | 9725478 | | 7/1997 |

* cited by examiner

*Primary Examiner*—Robert Dawson
*Assistant Examiner*—D. Aylward
(74) *Attorney, Agent, or Firm*—Stevens, Davis, Miller & Mosher, L.L.P.

(57) ABSTRACT

A resin composition for paper-coating, which comprises (A) a cross-linked amine compound which is a reaction product of (a) an aliphatic amine, (b) a glycidyl compound having at least two glycidyl groups in the molecule and (c) a compound selected from α,β-unsaturated carbonyl compounds, α,β-unsaturated nitrile compounds and α-halocarboxylic acid groups; and (B) at least one selected from a group consisting of (B1) non-polymer nonvolatile substances and (B2) polyhydric alcohols, is provided, and the resin composition for paper-coating can realize high quality of coated paper by being mixed with a pigment and an aqueous binder and being coated on paper, which does not cause generation of formaldehyde and which does not tend to produce disadvantages such as thickening and deterioration in flowing property, and for paper using the resin composition and a coated paper produced by using the coating composition are also provided.

20 Claims, No Drawings

RESIN COMPOSITION FOR PAPER-COATING, COATING COMPOSITION FOR PAPER AND COATED PAPER

This application is a Continuation-In-Part application of U.S. application Ser. No. 09/139,638, now U.S. Pat. No. 6,039,799, filed Aug. 25, 1998, and issued Mar. 21, 2000.

BACKGROUND OF THE INVENTION

The present invention relates to a resin composition for paper-coating, and a coating composition for paper comprising the resin composition, a pigment and an aqueous binder. More particularly, a resin composition for paper coating and a coating composition for paper are provided which do not cause generation of formaldehyde and can impart excellent printing suitability and printing effect on paper. The present invention also relates to a coated paper having a coat mainly composed of a pigment and an aqueous binder, not causing generation of formaldehyde, having excellent printing suitability and printing effect and exhibiting a good printing gloss. The term "paper" used in this specification has wide meaning, and includes a so-called paperboard in addition to a paper in narrow meaning.

Coated paper obtained by applying a coating composition mainly composed of a pigment and an aqueous binder and conducting necessary treatments such as drying, calendaring treatment and the like is widely used in commercial prints, journals, books and the like owing to its favorable features such as excellent printing effect, However, remaining efforts are still being conducted for improving quality of coated paper accompanying elevated requirement of quality, speed up of printing and the like. Particularly in offset printing, which occupies significant portion of printing, ink-receiving property under influence of wetting water, water resistance of wet pick and the like, improvement and advancement in printing gloss and blistering resistance in web press are required.

For accomplishing these subjects, there are conventionally known methods of adding, to a coating composition for paper, melamine-formaldehyde resins, urea-formaldehyde resins, polyamidepolyurea-formaldehyde resins as described in JP-B-44-11667 and JP-A-55-31837 (=U.S. Pat. No. 4,246,153), block glyoxal resins as described in JP-A-63-120197, or the like, as a water-resistance imparting agent or as an additive for a binder. However, any of these conventional water-resistance imparting agents and additives for a binder are not necessarily satisfactory in practice since important defects or insufficient effects in some characteristics are recognized although they give some effective merits.

For examples, so-called aminoplasto resins such as melamine-formaldehyde resins, urea-formaldehyde resins and the like cause some problems such as not only that generation of formaldehyde during work up or from coated paper is so much but also that effect for improving ink-receiving property and blistering resistance is poor, effect of manifesting water-resistance is not obtained easily when pH of a coated composition increases, and the like.

Polyamidepolyurea-formaldehyde resins impart improved effects, such as an improvement in ink-receiving property and water-resistance, to some extent. However, using polyamidepolyurea-formaldehyde resins, generation of formaldehyde cannot be prevented since formaldehyde is used in producing the resins.

On the other hand, block glyoxal resins, which are known as an additive for a binder containing no formaldehyde, have very little effect on improvement in quality of coated paper, such as ink-receiving property, blistering resistance and the like, though they can impart water-resistance against wetting water to a certain extent.

There is another problem that coated papers prepared by using a coating composition compounding a water-resistance imparting agent, such as aminoplasto resins and polyamidepolyurea-formaldehyde resins as mentioned above, on paper substrates tend to have deteriorated printing gloss comparing to coated papers prepared by using a coating composition consisting essentially of pigments and aqueous-binders. The deterioration of printing gloss lowers high-quality feeling of paper, since the high-quality feeling of paper comes from contrast between the non-printed portions and the printed portions and higher printing gloss in the non-printed portions gives the higher contrast.

Under these circumstances, the present inventors have previously proposed, in JP-A-10-77599, use of a cross-linked amine compound which is a reaction product of an aliphatic amine with a compound selected from aldehydes glycidyl compounds and isocyanate compounds, as a resin component in a coating composition for paper, for raising quality of coated paper. The present inventors have further proposed, in JP-A-11-140792, use of a cross-linked amine compound which is a reaction product of a hetrocyclic amine with a glycidyl compound, as a resin component in a coating composition for paper.

PROBLEMS TO BE SOLVED BY THE INVENTION

It has been found that, when such a cross-linked amine compound, which is a reaction product of an amine with a glycidyl compound and is described in JP-A-10-77599 and JP-A-11-140792, is used as a resin component, thickening of a coating composition, deterioration in flowing property and the like may occur depending on combination with other components, used amount of this cross-linked amine compound, and the like. The present inventors have further studied for solving such problems and for solving the problem of deterioration of printing gloss caused by a coating composition. As a result, the present invention has been completed.

An object of the present invention is to provide a resin composition for paper-coating which can produce high qualities of coated paper such as high ink-receiving property, excellent water-resistance and the like; and causes no generation of formaldehyde, responding to requirements on quality of coated paper.

Another object of the present invention is to provide a resin composition for paper-coating which hardly causes disadvantages such as thickening, deterioration in flowing property and the like, and, accordingly, is easily handled, when mixed with a pigment and an aqueous binder to form a coating composition for paper.

Further object of the present invention is to provide a coating composition for paper using the above resin composition.

Still further object of the present invention is to provide a coated paper causing no generation of formaldehyde, having good properties such as high ink-receiving property and excellent water-resistance, and exhibiting good printing gloss, which is produced by using the above coating composition for paper.

MEANS FOR SOLVING THE PROBLEMS

The present invention provides a resin composition for paper-coating which comprises (A) a cross-linked amine compound which is a reaction product of (a) an aliphatic amine and (b) a glycidyl compound having at least two glycidyl groups in the molecule, or a reaction product of (a) an aliphatic amine, (b) a glycidyl compound having at least two glycidyl groups in the molecule and (c) a compound selected from α,β-unsaturated carbonyl compounds, α,β-unsaturated nitrile compounds and α-halocarboxylic acid groups; and (B) at least one selected from a group consisting of (B1) non-polymer nonvolatile substance and (B2) polyhydric alcohols.

The present invention also provides a coating composition for paper which comprises (A) the above-described cross-linked amine compound,
(B) at least one selected from a group consisting of non-polymer nonvolatile substances and polyhydric alcohols, in addition to
(C) a pigment and
(D) an aqueous binder.

The present invention further provides a coated paper which comprises (1) a paper substrate and (2) a coat on the surface of the paper substrate comprising
(A) the above-described cross-linked amine compound,
(B) at least one selected from a group consisting of non-polymer nonvolatile substance and polyhydric alcohols,
(C) a pigment, and
(D) an aqueous binder.

PRACTICAL EMBODIMENTS OF THE INVENTION

The resin composition for paper-coating of the present invention comprises (A) a cross-linked amine compound which is obtained by reacting specific components, and (B) (B1) a non-polymer nonvolatile substance, and/or (B2) a polyhydric alcohol.

The cross-linked amine compound (A) is obtained by reacting (a) an aliphatic amine and (b) a glycidyl compound having at least two glycidyl groups in the molecule, or reacting (a) an aliphatic amine, (b) a glycidyl compound having at least two glycidyl groups in the molecule and (c) a compound selected from α,β-unsaturated carbonyl compounds, α,β-unsaturated nitrile compounds and α-halocarboxylic acid groups.

The aliphatic amine (a) used herein has a primary or secondary amino group connected to an aliphatic carbon atom. The aliphatic carbon atom to which an amino group is connected may constitute a non-aromatic ring. As long as an amino group is connected to an aliphatic carbon atom, a group other than an aliphatic hydrocarbon group, for example, and aromatic ring, may also be contained in the molecule. Further, a plurality of amino groups may be present in the molecule. Specific examples of the aliphatic amine (a) include monoalkylamines, dialkylamines, polyamines containing two or more amino groups in the molecule, aliphatic heterocyclic amends containing a nitrogen atom as at least one ring member, and the like. A kind of aliphatic amine may be used or these aliphatic amines may be used in combination of two or more kinds of them.

Monoalkylamine may be a compound in which a primary amino group is connected to an alkyl group having about 1 to 10 carbon atoms. Specific examples thereof include methylamine, ethylamine, propylamine and he like. Dialkylamine may be a compound in which two alkyl groups are connected to a secondary amino group, the alkyl groups being same to or different from each other and having about 1 to 10 carbon atoms respectively. Specific examples thereof include dimethylamine, diethylamine, dipropylamine, dibutylamine, methylethylamine and the like. The polyamine has a plurality of amino groups in the molecule, and, herein, means a compound other than heterocyclic amines described later. Specific examples thereof include ethylenediamine, diethylenetriamine, triethylenetetramine, isophoronediamine, bis(aminomethyl)cyclohexane, xylylenediamine and the like.

The heterocyclic amine is a cyclic compound containing at least one nitrogen atom as a ring member in addition to carbon atoms. Atoms constituting the heterocycle are not limited to carbon and nitrogen and other hetero atoms such as oxygen and sulfur can also constitute a ring, As long as, this compound contains a heterocycle having nitrogen as a ring atom, it may also contain an aliphatic hydrocarbon group, alicyclic hydrocarbon group, aromatic hydrocarbon group, acyl group and the like in addition to this heterocycle. Further, other amino group than the cyclic amino group and other substituent such as halogen and the like may be connected via such hydrocarbon group. Specific examples of the heterocyclic amine.include heterocyclic monoamines such as pyrrolidine, piperidine, 2-, 3- or 4-pipecoline and 2,4-, 2,6- or 3,5-rupetidine and the like, heterocyclic diamines such as piperadine, homopiperadine, N-alkyl(e.g., methyl, ethyl or propyl)piperadine, N-methylhomopiperadine, N-acyl(e.g., acetyl)piperadine, N-acyl(e.g., acetyl)homopiperadine and 1-(chlorophenyl) piperadine and the like, heterocyclic amines to which aminoalkyl is connected such as N-aminoalkyl(e.g., ethyl or propyl)piperidine, N-aminoalkyl(e.g., ethyl or propyl) piperazine, N-aminoalkyl(e.g., ethyl or propyl)morpholine, N-aminopropyl-2- or -4-pipecoline, 1,4-bis(aminoethyl) piperazine and 1,4-bis(aminopropyl)piperazine, and the like.

Among these aliphatic amines (a), monoalkylamines, dialkylamines, ethylenediamine, diethylenetriamine, heterocyclic amines and the like are industrially advantageous, and heterocyclic amines are particularly advantageous. Particularly preferable heterocyclic amines include pyrrolidine, piperidine, piperazine, N-aminoethylpiperazine, N-aminopropylpiperazine, 1,4-bis(aminoethyl)piperazine, 1,4-bis(aminopropyl)piperazine and the like.

The aliphatic amine (a) used in the present invention contains at least one primary or secondary amino group as described above. In the case of using a heterocyclic amine, it is advantageous to contain at least one primary amino group in addition to the secondary or tertiary amino group constituting the heterocycle, considering its reactivity with a glycidyl compound. Particularly, excellent effect is manifested when a compound in which an aminoalkyl group is connected to a heterocycle having nitrogen as a ring member, such as N-aminoethylpiperazine, N-aminopropylpiperazine, 1,4-bis(aminoethyl)piperazine, 1,4-bis(aminopropyl)piperazine and the like, are used singly or in combination with one or more of other amines.

The glycidyl compound (b), which is to be reacted with (a) an aliphatic amine or with (a) an aliphatic amine and (c) a compound selected from α,β-unsaturated carbonyl compounds, α,β-unsaturated nitrile compounds and α-halocarboxylic acid groups, is a compound halving at least two glycidyl groups in the molecule. The group through which a plurality of glycidyl groups are connected is not restricted, and any of aliphatic groups, aromatic groups, alicyclic groups and the like may be used. Specific examples of the glycidyl Compound (b) include alkylene glycol diglycidyl ethers such as ethylene glycol diglycidyl ether and propylene glycol diglycidyl ether, polyoxyalkylene glycol diglycidyl ethers such as polyethylene glycol diglycidyl ether and polypropylene glycol diglycidyl ether, aromatic diglycidyl ethers such as resorcin diglycidyl ether and bisphenol A diglycidyl ether, trimethylolpropane di or triglycidyl ether, sorbitol di-, tri-, tetra-, penta- or hexaglycidyl ether, pentaerythritol di-, tri- or tetraglycidyl ether and the like. These glycidyl compounds may be used as a single compound or in combination of two or more. Among them, an aromatic glycidyl ether is used advantageously.

The compound (c), which is to be reacted with (a) an aliphatic amine or a reaction product of (a) an aliphatic amine and (b) glycidyl compound having at least two glycidyl groups in the molecule, is selected from a group consisting of $\alpha,\beta$-unsaturated carbonyl compounds, $\alpha,\beta$-unsaturated nitrile compounds and $\alpha$-halocarboxylic acid groups. The $\alpha,\beta$-unsaturated carbonyl compounds and $\alpha,\beta$-unsaturated nitrile compounds, as compound (c), have a carbon-carbon double bond (ethylenic linkage) or a carbon-carbon triple bond (acetylenic linkage), and at least one of the carbon atoms constituting the double bond or the triple bond connects to a carbonyl group or a cyano group. When one carbon atom constituting the double bond or the triple bond connects to a carbonyl group or a cyano group, the carbon atom is $\alpha$-carbon and the other carbon atom is $\beta$-carbon. When two carbon atoms constituting the double bond or the triple bond connect to a carbonyl group and/or a cyano group, one of the carbon atoms is $\alpha$-carbon and the other carbon atom is $\beta$-carbon. The carbon-carbon double bond or a carbon-carbon triple bond in the $\alpha,\beta$-unsaturated carbonyl compounds and $\alpha,\beta$-unsaturated nitrile compounds is called $\alpha,\beta$-unsaturated bond. The $\alpha$-carbon and/or the $\beta$-carbon may further connected to an aliphatic hydrocarbon group, an aromatic hydrocarbon group or the like. The $\alpha,\beta$-unsaturated carbonyl compounds and $\alpha,\beta$-unsaturated nitrile compounds may contain plurality of carbonyl groups or cyano groups.

Examples of the $\alpha,\beta$-unsaturated carbonyl compound include carboxylic acids such as acrylic acid, crotonic acid, isocrotonic acid, methacrylic acid, sorbic acid and cinnamic acid, carboxylic acid esters such as methyl acrylate, ethyl acrylate, butyl acrylate, methyl crotonate, ethyl crotonate, methyl methacrylate, ethyl methacrylate, methyl cinnamate and ethyl cinnamate, aldehydes such as acrolein, crotonealdehyde and cinnamaldehyde, ketones such as methylvinyl ketone, mesityl oxide, benzal acetone, dibenzal acetone, benzal acetophenone and dypnone, dicarboxylic acids such as fumaric acid and maleic acid, and acid anhydrides such as maleic anhydride. Examples of the $\alpha,\beta$-unsaturated nitrile compound include nitrites such as acrylonitrile.

The $\alpha$-halocarboxylic Reid groups, as compound (c), are carboxylic acids, carboxylic acid salts or carboxylic acid esters in which the halogen atoms are connected to a part or all of the $\alpha$-carbons which is the carbon atoms connecting to the carbonyl group. When the halogen atoms are connected to a part of the $\alpha$-carbons, the remaining $\alpha$-carbons may be connected to an aliphatic hydrocarbon group, an aromatic hydrocarbon group, an alicyclic hydrocarbon group or the like. Examples of the $\alpha$-halocarboxylic acid groups include $\alpha$-halocarboxylic acids such as chloro acetic acid, bromo acetic acid, dichloro acetic acid, dibromo acetic acid, trichloro acetic acid, $\alpha$-chloro propionic acid, $\alpha$-chloro butyric acid and $\alpha$-bromo isovaleric acid, $\alpha$-halocarboxylic acid esters such as methyl chloroacetate, ethyl chloroacetate, butyl chloroacetate, methyl bromoacetate, ethyl bromoacetate and propyl bromoacetate, and $\alpha$-halocarboxylic acid salts such as sodium chloroacetate and sodium bromoacetate.

One kind of the compound (C) may be used singly or two or more kind of the compounds (c) may be used in combination Among the compounds (c) mentioned above, $\alpha,\beta$-unsaturated carboxylic acids and $\alpha,\beta$-unsaturated carboxylic acid esters and a-chlorocarboxylic acids are advantageous from the industrial view point. Particularly, acrylic acid and chloro acetic acid are preferred.

As the method of reacting reacting (a) an aliphatic amine, (b) a glycidyl compound having at least two glycidyl groups in the molecule and (c) a compound selected from $\alpha,\beta$-unsaturated carboxylic compounds, $\alpha,\beta$-unsaturated nitrile compounds and $\alpha$-halocarboxylic acid groups, the following methods (1) to (5) can be exemplified.

(1) An aliphatic amine (a) and a glycidyl compound (b) are reacted and, then, a compound (c) is reacted with the reaction product of (a) and (b).

(2) An aliphatic amine (a) and a compound (c) are reacted and, then, a glycidyl compound (b) is reacted with the reaction product of (a) and (c).

(3) An aliphatic amine (a) and a compound (c) are reacted and, then, a glycidyl compound (b) is reacted with the reaction product of (a) and (c). Thereafter, a compound (c) is further reacted with the reaction product of (a), (b) and (c). In this case, the compound (c) reacted at first and the compound (c) reacted later may be same to or different from each other.

(4) An aliphatic amine (a) and a glycidyl compound (b) are reacted and, then, a compound (c) is reacted with the reaction product of (a) and (b). Thereafter, a glycidyl compound (b) is further reacted with the reaction product of (a), (b) and (c). In this case, the glycidyl compound (b) reacted at first and the glycidyl compound (b) reacted later may be same to or different from each other.

(5) An aliphatic amine (a), a glycidyl compound (b) and a compound (c) are reacted at the same time.

Among the methods mentioned above, (1) is usual but the method is not restricted to them.

The glycidyl compound (b) is used in the range usually from 0.1 to 1.5 mol, preferably from 0.3 to 1.2 mol. further preferably from 0.5 to 1 mol based on 1 mol of an aliphatic amine (a). Even if there are a plurality of reactive primary or secondary amino groups in an aliphatic amine, when the amount of a glycidyl compound (b) is increased, the reaction product tends to be gelled. Therefore, it is suitable that the molar ratio of a glycidyl compound to an aliphatic amine is 1.5 or less irrespective of the number of amino groups.

The compound (c) is used in the range usually from 0 to 1.5 mol, preferably from 0.05 to 1 mol, further preferably from 0.1 to 0.5 mol based on 1 mol of an aliphatic amine (a). When the reaction of the aliphatic amine (a) and the compound (c) is conducted before the reaction of the aliphatic amine (a) and the glycidyl compound (b), a part of the aliphatic amine (a) must remain not reacted with the compound (c), so that a cross-linked amine compound is produced by the reaction of the remaining amino group and the glycidyl compound (b).

The reaction of an aliphatic amine. (a) and a glycidyl compound (b) and the reaction of an aliphatic amine (a), a glycidyl compound (b) and a compound (c) can be conducted without using a solvent or in a solvent. This reaction is usually conducted at a temperature prom 30 to 100° C. The preferable reaction temperature is from about 40 to 90° C. when a water/organic mixed solvent system is used as the solvent and from about 40 to 70° C. when an organic solvent containing no water is used as the solvent, though it varies depending on presence or absence of a solvent, the kind of solvent if used, and the like. The reaction time is usually from about 1 to 20 hours. This reaction progresses even if no catalyst is used, and may also be conducted in the presence of a basic catalyst such as ammonia and sodium hydroxide or a Lewis acid catalyst such as aluminum chloride and the like.

Examples of the solvent used in this reaction include alcohols such as methanol, ethanol, 1- or 2-propanol, 1- or 2-butanol, 1-pentanol, 3-methyl-1-butanol, 1-hexanol, 4-methyl-2-pentanol, 2,4-dimethyl-3-pentanol, 2,6-dimethyl-4-heptanol, 2-ethyl-1-hexanol, 1- or 2-ocatanol, laurylalcohol, cyclohexanol and benzyl alcohol; ethers such as diethyl ether, dipropyl ether, diisopropyl ether, dibutyl ether, β,β'-dichloro diethyl ether, 1,4-dioxane, furfuryl alcohol, tetrahydrofurfuryl alcohol, ethylene glycol monomethyl ether, ethylene glycol monoethyl ether, ethylene glycol monobutyl ether, ethylene glycol diethyl ether, diethylene glycol monomethyl ether, diethylene glycol monoethyl ether, diethylene glycol monobutyl ether and diethylene glycol dibutyl ether; aldehydes such as butylaldehyde; hydrocarbons such as cyclohexane, hexane, heptane, toluene and o-, m- or p-xylene; organohalogen compound such as 1,1,1-trichloroethane, trichloroethylene, 1- or 2-bromopropane, 1-bromobutane, lauryl bromide, 1-bromo-3-chloropropane, 1,3-dibromopropane, 1,4-dibromoethane 1,5-dibromopentane and 2,3-dibromo-1-propanol; ketones such as acetone, 2,4-pentanedione, methylethylketone, 2- or 3-pentanone, 3-methyl-2-butanone, methyl isobutyl ketone, 2-heptanone, 2,6-dimethyl-4-heptanone, 2,4-dimethyl-3-pentanone, cyclohexanone, mesityl oxide, isophorone and 4-hydroxy-4-methyl-2-pentanone; esters such as methyl acetate, ethyl acetate, propyl acetate, isopropyl acetate, butyl acetate, sec-butyl acetate, isobutyl acetate, amyl acetate, benzyl acetate, ethyl propionate, butyl propionate, amyl propionate, methyl benzoate, ethyl benzoate, diethyl malonate, diethyl oxalate, butyl phosphate and ethyl acetoacetate and the like. They may be used alone or in combination of two or more.

Also, a mixture of one or more of these organic solvents with water can be used as the solvent for the reaction.

When an aliphatic amine (a) and a glycidyl compound (b) are reacted, or the reaction product of an aliphatic amine (a) and a compound (c) is reacted with a glycidyl compound (b), the amount of water in the reaction system is preferably 20% by weight or less, more preferably 10% by weight or less, since, if the amount of water present in the reaction system is too large, an epoxy resin is produced which is insoluble in both water and an organic solvent due to mutual polymerization of diglycidyl compounds.

When an aliphatic amine (a) and a compound (c) are reacted, or the reaction product of an aliphatic amine (a) and a glycidyl compound (b) is reacted with a compound (c), the ratio of water and the organic solvent is not restricted. In this case, only water may be used as the solvent.

Structure of the reaction product is widely dispersed and a lower polymer having a certain degree of molecular distribution may sometimes be formed depending on
the kind of an aliphatic amine (a),
the kind or a glycidyl compound (b),
the kind of a compound (c),
the use ratio among an aliphatic amine (a), a glycidyl compound (b) and a compound (c),
the reaction order, and the like.

Main reaction embodiments of the reaction of an aliphatic amine (a) and a glycidyl compound (b) will be exemplified below on the assumption that the glycidyl compound (b) has a structure having two glycidyl groups, represented by the formula Gly-R-Gly, wherein Gly represents a glycidyl group and R represents a divalent group. (Hereinafter, in this specification, Gly represents a glycidyl group.)

When an aliphatic amine (a) has a primary amino group represented by the formula $R^1$—$NH_2$, wherein $R^1$ represents a monovalent aliphatic group, the following reaction progresses mainly, and in some cases, a glycidyl compound may be added to a secondary amino group in this product to form other structure connecting to an amine molecule.

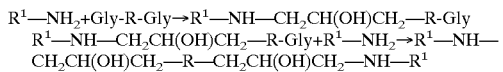

When un aliphatic amine (a) has a secondary amino group, which is expressed as $R^1$—NH—$R^2$ (in the case of a heterocyclic monoamine, it may be considered that $R^1$ and $R^2$ are connected to form a ring), the following reaction progresses mainly.

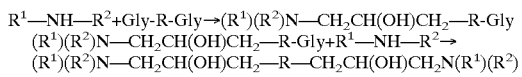

When an aliphatic amine (a), a glycidyl compound (b) and a compound (c), the structure of (c) being represented by the formula $R^1$—CH=CH—$COR^2$ or $R^3$—C(X)H—$COOR^4$, are reacted in this order, main reaction embodiments of the reaction will be exemplified below on the assumption that the glycidyl compound (b) has a structure having two glycidyl groups, represented by the formula Gly-R-Gly.

When an aliphatic amine (a) has a primary amino group represented by the formula $R^3$—$NH_2$, wherein $R^3$ represents a monovalent aliphatic group, the following reaction progresses mainly, and in some cases, a glycidyl compound may be added to a secondary amino group in this product to form other structure connecting to an amine molecule. When the compound (c) has a structure represented by the formula $R^1$—CH=CH—$COR^2$, it is added to the amino group remained in the reaction product of the aliphatic amine (a) and the glycidyl compound (b). When the compound (c) has a structure represented by the formula $R^3$—C(X)H—$COOR^4$, an addition reaction to the amino group and dehalogenation occur.

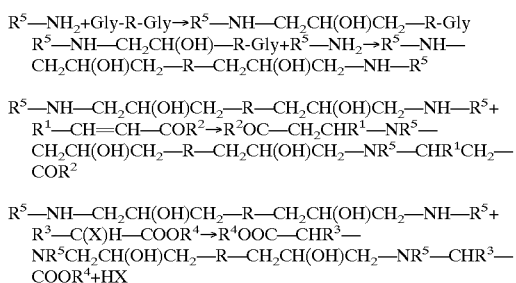

Further, when the aliphatic amine (a) has a plurality of amino groups, when two or more kinds of aliphatic amines (a) are used together, when the glycidyl compound (b) has three or more glycidyl groups, when the compound (c) has plurality of α,β-unsaturated bonds or plurality of α-halogen, the reaction becomes further complicated, and in any case, a cross-linked amine compound (A) in which a plurality of amine molecules are cross-linked will be mainly produced.

As described above, a cross-linked amine compound (A) obtained by reaction of an aliphatic amine (a), a glycidyl compound (b) and a compound (c) may become a lower polymer having a certain degree of molecular distribution depending on structure of the raw material aliphatic amine. The viscosity of a 50 wt % aqueous solution at 25° C., an indicator of molecular weight, may be usually in the range from 10 to 100000 mPa·s. It is more preferable that this viscosity is 100 mPa·s or more, further 1000 mPa·s or more and 50000 mPa·s or less.

A nonvolatile substance (B1) and/or a polyhydric alcohol (B2) are used as another component (B) of a resin composition for paper-coating. The resin composition for paper-coating may comprise both of a nonvolatile substance (B1) and a polyhydric alcohol (B2) in addition to the above mentioned cross-linked amine compound. In alternative, the resin composition for paper-coating may comprise one of the nonvolatile substance (B1) and the polyhydric alcohol (B2), although comprising the nonvolatile substance (B1) is preferred.

The nonvolatile substance (B1) is an organic or inorganic non-polymer compound which has no volatility at ordinary temperature and can be dissolved or uniformly dispersed in this composition together with a cross-linked amine compound (A). The non-polymer herein referred has a specific molecular weight. The nonvolatile substance (B1) is used for reducing reverse effects such as thickening and deterioration in flowing property which may be sometimes caused when a cross-linked amine compound is used as a component of a coating composition, without losing effect to impart excellent printing suitability and printing effect to paper, which are originally owned by the cross-linked amine compound.

Specific examples of the non-volatile substance (B1) include inorganic salts such as ammonium chloride, sodium chloride, calcium chloride, magnesium chloride, aluminum chloride, ammonium sulfate, sodium sulfate and ammonium phosphate; ureas such as urea, methylurea, dimethylurea, thiourea, 4,5-dihydroxy2-imidazolidinone and 1-(2-aminoethyl)-2-imidazolidinone; saccharides such as glucose and fructose. The ureas herein referred include ureas having an atomic group represented by the formula >NC(Q=) N<, wherein Q represents oxygen or sulfur, and derivatives thereof They are more specifically represented by the formula $X^1NHC(=Q)NX^2X^3$ for example, wherein Q represents oxygen or Sulfur, $X^1$, $X_2$ and $X^3$ each independently represents hydrogen, alkyl or substituted alkyl, or $X^1$ and $X^2$ are connected to form an ethylene chain which may be substituted with a hydroxyl group. Among ureas, 1-(2-aminoethyl)-2-imidazolidinone can be obtained by de-ammonia reaction of diethylenetriamine with urea. This reaction product also contains by-products other than 1-(2-aminoethyl)-2-imidazolidinone and, usually, the mixture containing the by-products can be used as it is. Among these nonvolatile substances, organic compounds, particularly ureas are preferable due to compatibility with a cross-linked amine compound (A), solubility into various solvents, and the like, Preferable among ureas are urea and imidazolidinones, and urea is particularly preferable from industrial standpoint.

When the resin composition for paper-coating of the present invention contains a cross-linked amine compound (A) and a nonvolatile substance (B1) and the cross-linked amine compound (A) and a nonvolatile substance (B1) is dissolved or dispersed in a liquid medium, the mixing order of them is not particularly restricted. As the method of mixing, the following methods (1) to (3) can be exemplified.
(1) A cross-linked amine compound is previously dispersed or dissolved in a liquid medium and a nonvolatile substance is added thereto and mixed.
(2) A nonvolatile substance is previously dispersed or dissolved in a liquid medium and then the resultant is added to a cross-linked amine compound.
(3) A cross-linked amine compound and a nonvolatile compound are dispersed or dissolved in respective liquid media, which are the same to or different from each other and, then, these are mixed to obtain uniform condition, and the like.

From the standpoint of simplicity of operation, the method (1) in which a cross-linked amine compound (A) is previously dispersed or dissolved in a liquid medium and a nonvolatile substance (B1) is mixed thereto is preferable.

The temperature when a cross-linked amine compound (A) and a nonvolatile substance (B1) are mixed is not particularly restricted, and when solubility or miscibility of them into a liquid medium used is not sufficient, the mixture may be heated if necessary to a extent wherein the liquid medium does not evaporate. Conversely, when one or both of a cross-linked amine compound (A) and a nonvolatile compound (B1) form a solvate with the liquid medium to generate heat significantly, the mixture may be cooled to a extent wherein freezing does not occur.

As described above, it is preferable that the cross-linked amine compound (A), which is a reaction product of an aliphatic amine (a) and a glycidyl compound (b) or a reaction product of an aliphatic amine (a), a glycidyl compound (b) and a compound (c), is prepared in the form of a solution or dispersion in the liquid medium, and then a nonvolatile substance (B1) is added thereto and mixed.

A solution or dispersion of a cross-linked amine compound (A) can be obtained by reacting an aliphatic amine (a) with a glycidyl compound (b) in a liquid medium, or reacting an aliphatic amine (a) with a glycidyl compound (b) followed by adding a liquid medium thereto for dissolution or dispersion.

Any liquid medium which can dissolve or uniformly disperse a cross-linked amine compound (A) and a nonvolatile substance (B1) can be used. The liquid medium can be water and/or an organic solvent. Various solvents previously exemplified as a solvent for the reaction for obtaining a Cross-linked amine compound (A) Can also be used as the liquid medium in this case. Particularly, any of alcohols may be advantageously used alone or in combination of two or more, or in combination with another organic solvent, since alcohols are excellent in dissolving property and dispersing property for the cross-linked amine compound (A).

When a glycidyl compound (b), which is one raw material of a cross-linked amine compound (A) in the present invention, is poorly soluble only in water, water and an organic solvent can be mixed and used in reacting an aliphatic amine (a) with a glycidyl compound (b) and this liquid medium can be used, without any modification, as a liquid medium for the cross-linked amine compound (A). Depending on the case, it is also possible that water is added after the completion of reaction to reduce the ratio of an organic solvent in a liquid medium for dissolving or dispersing a cross-linked amine compound (A). The ratio of an organic solvent to water in a liquid medium for dissolving or dispersing a cross-linked amine compound is not restricted, and usually, the ratio of water used to an organic solvent is from 1 to 100% by weight, and the ratio of an organic solvent is from 99 to 0% by weight. Particularly it is preferable that the ratio of water used to an organic solvent is from 3 to 50% by weight and the ratio of an organic solvent used is from 97 to 50% by weight, when the cross-linked amine compound (A) is mixed with a non-polymer nonvolatile substance (B1) ; and the ratio of water used to an organic solvent is from 5 to 50% by weight and the ratio of an organic solvent used is from 95 to 50% by weight, when the cross-linked amine compound (A) is mixed with a polyhydric alcohol (B2).

Further, it is also possible that a liquid medium used for a cross-linked amine compound (A) is substantially composed of only water by adopting a method in which reaction of an aliphatic amine (a) with a glycidyl compound (b) is conducted in an organic solvent and after the completion of the reaction, the organic solvent is distilled off and water is added. In this case, it is advantageous that a glycidyl compound (b) is dissolved in ketones, while an aliphatic amine (a) is dissolved in a hydrophilic organic solvent other than ketones, and both solutions are mixed for reaction. The ketones for dissolving a glycidyl compound (b) can be various compounds exemplified previously as solvents for reaction in obtaining a cross-linked amine compound (A), and among them, acetone is advantageously used. On the other hand, the hydrophilic organic solvent other than ketones for dissolving an aliphatic amine (a) can also be selected from various hydrophilic organic solvents other than ketones exemplified previously as solvents for reaction in obtaining a cross-linked amine compound (A). Among them, alcohols, particularly methanol, is advantageously used from industrial standpoint.

Distillation of a solvent conducted after the completion of reaction is usually conducted by normal pressure distillation, although it can also be conducted by reduced-pressure distillation and water-vapor distillation. Two or more of the methods may be combined such was water-vapor distillation after normal pressure distillation, and the like. In the case of normal pressure distillation, heating is preferably conducted in the range from the boiling point of a solvent up to 100° C., further up to 60° C., since when the temperature is raised too much, a cross-linked amine compound (A) is colored Addition of water after removal of the solvent is preferably conducted at a temperature in the range from 50 to 120° C. Poor dissolution tends to occur in the condition wherein an organic solvent has been distilled off, if the temperature at which water is added is too low since a cross-linked compound is present alone and the viscosity is too high. Further, too high temperature in adding water is not preferable from the standpoint of disaster prevention due to crisis such as bumping or the like.

The resin composition for paper-coating of the present invention which comprises a cross-linked amine compound (A) and a nonvolatile substance (B1) as described above is obtained by mixing them. The ratio by weight of them (former/latter) is usually in the range from 1/99 to 90/10, preferably in the range from 5/95 to 70/30, when the resin composition does not comprise a polyhydric alcohol (B2).

The polyhydric alcohol (B2), which may be another ingredient of the resin composition for paper coating of the present invention, is used for reducing reverse effects such as thickening and deterioration in flowing property which may be sometimes caused when a cross-linked amine compound (A) is used as a component of a coating composition, without losing effect too impart excellent printing suitability and printing effect to paper, which are originally owned by the cross-linked amine compound. The polyhydric alcohol (B2), together with the cross-linked amine compound (A), is to remain as an effective ingredient in the coat of the coated paper prepared by coating the coating composition for paper on a paper and evaporating the liquid medium, which is usually water or a mixture of water and an organic solvent, in the coating composition, Therefore, usually, a polyhudric alcohol having the boiling point higher than the boiling point of water is used. The polyhydric alcohol (B2) has at least two alcoholic hydroxyl groups in a molecule. Examples thereof include diols such as ethylene glycol, propylene glycol, diethylene glycol, dipropylene glycol triethylene glycol, polyethylene glycol, polypropylene glycol, 1,3-propanediol, 1,4-butanediol, 1,5-pentanediol, 1,6-hexanediol, neopentyl glycol, cyclohexanediol, cyclohexane dimethanol and xylilenediol, triols such as glycerin and trimethylol propane, tetraols such as pentaerythritol, and saccharides such as glucose, mannose, sorbitol, xylitol, sucrose and fructose. Preferably, it is a polyhydric alcohol having the molecular weight of 500 or smaller. When the polyhydric alcohol (B2) is a saccharide, sorbitol, xylitol or the like, which has no reducing group is preferable. From a industrial stand point, diethylene glycol, triethylene glycol, glycerin and saccharides having no reducing property such as sorbitol and xylitol are preferred.

When the resin composition for paper-coating of the present invention contains a cross-linked amine compound (A) and a polyhydric alcohol (B2), the mixing order of them is not particularly restricted. It is advantageous the resin composition for paper-coating of the present invention comprising a cross-linked amine compound (A) and a polyhydric alcohol (B2) is dissolved or dispersed in a liquid medium. From the standpoint of simplicity of operation, the resin composition is preferably prepared by a method in which a cross-linked amine compound (A) is previously dispersed or dissolved in a liquid medium and a polyhydric alcohol (B2) or a solution thereof is added thereto and mixed. However, the preparation of the resin composition for paper-coating of the present invention comprising a cross-linked amine compound (A) and a polyhydric alcohol (B2) can also be conducted by a method in which a polyhydric alcohol (B2) is previously dispersed or dissolved in a liquid medium and then a cross-linked amine compound (A) is added thereto, a method in which both of a cross-linked amine compound (A) and a polyhydric alcohol (B2) are dispersed or dissolved in respective liquid media, which are the same to or different from each other and, then, these are mixed to obtain uniform condition, and the like. If the polyhydric alcohol (B2) is a liquid, it can also be used as the solvent for the synthesis of the cross-linked amine compound (A). The temperature when a cross-linked amine compound (A) and a polyhydric alcohol (B2) are mixed is not particularly restricted, and when solubility or miscibility of them into a liquid medium used is not sufficient, the mixture may be heated if necessary to a extent wherein the liquid medium does not evaporate. Conversely, when one or both of the cross-linked amine compound (A) and the polyhydric alcohol (B2) form a solvate with the liquid medium to generate heat significantly, the mixture may be cooled to a extent wherein freezing does not occur.

When the resin composition for paper-coating of the present invention comprises a cross-linked amine compound (A) and polyhyric alcohol (B2), but does not comprise a nonvolatile substance (B1), the ratio by weight of them (former/latter) is usually in the range from 1/99 to 90/10, preferably in the range from 5/95 to 70/30.

When the resin composition for paper-coating of the present invention comprises a cross-linked amine compound (A), a polyhyric alcohol (B2) and a nonvolatile substance (B1), the ratio by weight of the cross-linked amine compound (A) to the total amount of the polyhyric alcohol (B2) and the nonvolatile substance (B1) is usually in the range from 1/99 to 90/10, preferably in the range from 5/95 to 70/30. The amount of the nonvolatile substance (B1) is preferably 5 times by weight or smaller than the amount of the polyhydric alcohol (B2).

The resin composition thus prepared containing a cross-linked amine compound (A) and a nonvolatile substance (B1) aid/or a polyhydric alcohol (B2) is mixed with a pigment (c) and an aqueous binder (D) to give a coating composition for paper. This coating composition for paper comprises a pigment (C), and aqueous binder (D), the above-described cross-linked amine compound (A) and the above-described nonvolatile compound (B1) and/or a polyhydric alcohol (B2). Though it is not essential that the cross-linked amine compound (A) and the nonvolatile compound (B1) and/or a polyhydric alcohol (B2) are previously mixed, it is usually advantageous that a resin composition containing the cross-linked amine compound (A) and the nonvolatile compound (B1) andjor a polyhydric alcohol (B2) is prepared, then is compounded with a pigment (C) and an aqueous binder (D).

In preparing the coating composition for paper of the present invention, the composition ratio of a pigment (C) and an aqueous binder (D) is determined according to use and object and is not particularly different from that adopted generally in the art. Regarding preferable composition ratio of them, the ratio of an aqueous binder (D) is from about 1 to 200 parts by weight, more preferably from 5 to 50 parts by weight based on 100 parts by weight of a pigment (C). Regarding the cross-linked amine compound (A) and the nonvolatile substance (B1) and/or a polyhydric alcohol (B2), the total amount of them in terms of solid weight is preferably from 0.05 to 5 parts by weight, and more preferably from 0.1 to 2 parts by weight, based on 100 parts by weight of a pigment (C).

The pigment (C) used as a component of a coating composition for paper may be one which is conventionally used generally for coating of paper, and white inorganic pigments and white organic pigments can be used. Examples of the while inorganic pigment include kaolin, talc, calcium carbonate (heavy or light)s aluminum hydroxide, satin white, titanium oxide and the like. Examples of the white organic pigment include polystyrene melamine-formaldehyde resins, urea-formaldehyde resins and the like. These resins may be used alone or in combination of two or more, respectively.

The aqueous binder (D) also may be one which is conventionally used generally for coating of paper, and water-soluble binders and water-emulsified binders can be used. Examples of the aqueous binder (D) include non-modified or modified starches including oxidized starch and phosphated starch, polyvinyl alcohol, water-soluble protein including casein and gelatin, modified celluloses including carboxymethylcellulose, and the like. Examples of the water-emulsified binder include styrene-butadiene resins which may optionally have a carboxyl group or a nitrile group (SBR latex), acrylonitirile-butadiene resins (NBR latex), chloroprene resin (CR latex), methylmethaacrylate-butadiene resins (MBR latex)I copolymer reins two or more kind of acrylic monomers, copolymer resins of an acrylic monomer and vinyl acetate, copolymer resins of an acrylic monomer and styrene, vinyl acetate resins, styrene-vinyl acetate resins, ethylene-vinyl acetate resins, and the like. The acrylic monomer herein referred means a compound selected from acrylic acid, methacrylic acid, and methyl, ethyl or butyl ester thereof. These aqueous binders may be used alone or in combination of two or more, respectively.

In preparing a coating composition for paper, the addition and mixing order of a pigment (C), aqueous binder (D) and resin composition is optional and is not particularly restricted. However, it is generally advantageous that after a resin composition comprising a cross-linked amine compound (A) and a non-polymer nonvolatile substance (B1) and/or a polyhydric alcohol (B2) is prepared, a pigment (C) and an aqueous binder (D) are compounded in the resin composition.

For example, a method in which a resin composition dissolved or dispersed in a liquid medium is added to and mixed with a mixture of a pigment (C) and an aqueous binder (D), a method in which a resin composition dissolved or dispersed in a liquid medium is previously added to and mixed with a pigment (C) or an aqueous binder (D) and the resulting mixture is compounded with the remaining component, and the like are adopted.

The coating composition for paper of the present invention can contain other resin composition such as a water-resistance imparting agent, printing suitability improving agent and the lie if necessary, in addition to the above-described cross-linked amine compound (A) and the nonvolatile substance (B1) and/or a polyhydric alcohol (R2). Further, as other component, for example, a dispersing agent, viscosity and flowability controlling agent, defoaming agent, preservative, lubricant and water-retaining agent, and coloring agents such as a dye and a colored pigment, and the like can be compound if necessary.

The coating composition for paper of the present invention is coated on a paper substrate by a conventionally known method, for example, a method using known various coaters such as a blade coater, air knife coater, bar coater, size press coater, gate roll coater, cast coater and the like. The coated paper of the present invention can be produced by conducting necessary drying thereafter, and further, conducting lubricating treatment by a super calendar and the like, if necessary.

In the coated paper according to the present invention, a coat comprising a specific ingredients as mentioned above is formed on the paper substrate The coat is formed on at least one surface of the paper substrate. The coat may be formed on both surfaces of the paper substrate. The Coat comprises (C) a pigment, (D) an aqueous binder; (A) a cross-linked amine compound which is a reaction product of (a) an aliphatic amine and (b) a glycidyl compound having at least two glycidyl groups in the molecule or a reaction product of (a) an aliphatic amine, (b) a glycidyl compound having at least two glycidyl groups in the molecule and (c) a compound selected from $\alpha,\beta$-unsaturated carbonyl compounds, $\alpha,\beta$-unsaturated nitrile compounds and $\alpha$-halocarboxylic acid groups; and (B) at least one selected from a group consisting of non-polymer nonvolatile substances and polyhydric alcohols.

The coat of the coated paper of the sent invention can further contain other resin composition such as a water-resistance imparting agent, printing suitability improving agent and the like if necessary. Still further, for example, a dispersing agent, viscosity and flowability controlling agent, defoaming agent, preservative, lubricant and water-retaining agent, and coloring agents such as a dye and a colored pigment, and the like can be compounded if necessary.

EXAMPLE

The following examples further illustrate the present invention in more detail, but do no limit the scope thereof. In the examples, % and part expressing the content or amount used are by weight unless otherwise stated Viscosity and pH were measured at 250° C.

Synthesis Example 1

Into a four-necked flask equipped with a thermometer, reflux condenser and stirring rod were charged 516.8 g (4.00 mol) of N-(2-aminoethyl)piperazine and 396.1 g of methanol. The inner temperature was maintained at from 45 to 55° C., and to this was slowly added dropwise a solution prepared previously by mixing 802.7 g (2.36 mol) of bisphenol A diglycidyl ether and 416,4 g of acetone. After the completion of the dropwise addition, the reaction was continued further for 4 hours at an inner temperature from 45 to 55° C. Then, after the reflux condenser was substituted by a Liebig condenser, the inner temperature was raised up to 120° C. while extracting acetone and methanol out of the system. Then, the mixture was cooled while adding 597.6 g of water gradually to obtain an aqueous solution of a cross-linked amine compound having a nonvolatile component content of 63.8 %, pH of 12.5 and a viscosity of 89,500 mPa·s (about 10,000 mPa·s in terms of 50% concentration).

Synthesis Example 2

Into the same reaction vessel as used in Synthesis Example 1 were charged 92.9 g (0.72 mol) of N-(2-aminoethyl)piperazine and 99.0 g of methanol. The inner temperature was maintained at from 45 to 55° C., and to this was slowly added dropwise a solution prepared previously by mixing 105.0 g (0.31 mol) of bisphenol A diglycidyl ether and 99.0 g of acetone. After the completion of the dropwise addition, the reaction was continued further for 4 hours at an inner temperature from 45 to 55° C. Then, after the reflux condenser was substituted by a Liebig condenser, the inner temperature was raised up to 120° C. while extracting acetone and methanol out of the system. Then, the mixture was cooled while adding 243.4 g of water gradually to obtain an aqueous solution of a cross-linked amine compound having a nonvolatile component content of 39.9 %, pH of 12.1 and a viscosity of 1,898 mPa·s (about 9,000 mPa·s in terms of 50% concentration).

Synthesis Example 3

Into the game reaction vessel as used in Synthesis Example 1 were charged 64.6 g (0.50 mol) of N-(2-aminoethyl)piperazine and 78.0 g of methanol. The inner temperature was maintained at from 45 to 55° C., and to this was slowly added dropwise a solution prepared previously by mixing 91.3 g (0.27 mol) of bisphenol A diglycidyl ether and 77.9 g of acetone. After the completion of the dropwise addition, the reaction was continued further for 4 hours at an inner temperature from 45 to 55° C. Then, after the reflux condenser was substituted by a Liebig condenser, the inner temperature was raised up to 120° C. while extracting acetone and methanol out of the system. Then, the mixture was cooled while adding 188.6 q of water gradually to obtain an aqueous solution of a cross-linked amine compound having a nonvolatile component content of 41.8%, pH of 12.4 and a viscosity of 1,839 mPa·s (about 6,500 mPa·s in terms of 50% concentration).

Synthesis Example 4

Into the same reaction vessel as used in Synthesis Example 1 were charged 75.6 g (0.59 mol) of N-(2-aminoethyl)piperazine and 96.6 g of methanol. The inner temperature was maintained at from 45 to 55° C., and to this was slowly added dropwise a solution prepared previously by mixing 117.6 g (0.35 mol) of bisphenol A diglycidyl ether and 96.6 g of acetone. After the completion of the dropwise addition, the reaction was continued further for 4 hours at an inner temperature from 45 to 55° C. Then, after the reflux condenser was substituted by a Liebig condenser, the inner temperature was raised up to 120° C. while extracting acetone and methanol out of the system. Then, the mixture was cooled while adding 236.4 g of water gradually to obtain an aqueous solution of a cross-linked amine compound having a nonvolatile component content of 42.7%, pH of 12.4 and a viscosity of 3,980 mPa·s (about 12,000 mPa·s in terms of 50% concentration).

Synthesis Example 5

Into the game reaction vessel as used in Synthesis Example 1 were charged 90.6 g (0.70 mol) of N-(2-aminoethyl)piperazine and 96.5 g of methanol. The inner temperature was maintained at from 45 to 55° C., and to this was slowly added dropwise a solution prepared previously by mixing 102.5 g (0.31 mol) of bisphenol A diglycidyl ether and 96.6 g of acetone. After the completion of the dropwise addition, the reaction was continued further for 4 hours at an inner temperature from 45 to 55° C. Then, after the reflux condenser was substituted by a Liebig condenser, the inner temperature was raised up to 120° C. while extracting acetone and methanol out of the system. Then, the mixture wag cooled while adding 233.7 g of water gradually to obtain an aqueous solution of a cross-linked amine compound having a nonvolatile component content of 38.7%, pH of 12.2 and a viscosity of 560 mPa·s (about 3,000 mPa·s in terms of 50% concentration).

Synthesis Example 6

Into a four-necked flask equipped with a thermometer, reflux condenser and stirring rod were charged 90.4 g (0.7 mol) of N-(2-aminoethyl)piperazine and 109.1 g of methanol The inner temperature was maintained at from 45 to 55° C., and to this was slowly added dropwise a solution prepared previously by mixing 140.6 g (0.77 mol) of bisphenol A diglycidyl ether having an epoxy equivalent of 182.6 g/eq. and 120.0 g of acetone. After he completion of the dropwise addition, the reaction was continued further for 4 hours at an inner temperature from 45 to 55° C. Then, after the reflux condenser was substituted by a Liebig condenser, the inner temperature was raised Up to 120° C. while extracting acetone and methanol out of the system. Then, the mixture was cooled while adding 295.2 g of water gradually to obtain 531.8 g of an aqueous solution of an intermediate of a cross-linked amine compound.

Into the same reaction vessel as used above, was charged 141.2 g of the aqueous solution of the intermediate of a cross-linked amine compound. Thereto, while keeping the inner temperature at from 65 to 75° C., was slowly added dropwise 8.37 g (0.093 mol) of an 80% by weight aqueous solutions of acrylic acid over one hour. After the completion of the dropwise addition, the reaction was continued further for 4 hours at an inner temperature from 65 to 75° C. to obtain an aqueous solution of a cross-linked amine compound having a nonvolatile component content of 45.3%, pH of 9.1 and a viscosity of 1735 mPa·s.

Synthesis Example 7

A solution was prepared by mixing 637.6 g (3.47 mol) of bisphenol A diglycidyl ether having an epoxy equivalent of 184.0 g/eq. and 542.6 g of acetone. Total amount of the obtained Solution wag 1180.2 g.

Into the same reaction vessel as used in Synthesis Example 6 were charged 423.4 g (3.3 mol) of N-(2-aminoethyl)piperazine and 516.8 g of methanol. Thereto, while keeping the inner Temperature at from 48 to 54° C., 1124.0 g of the solution obtained above was slowly added dropwise over 5 hours. After the completion of the dropwise addition, the reaction was continued further for 4 hours at an inner temperature from 48 to 54° C. Then, after the reflux condenser was substituted by a Liebig condenser, the inner temperature was raised up to 120° C. while extracting acetone and methanol out of the system. Then, the mixture was cooled while adding 1285.7 g of water gradually to obtain 2384.0 g of an aqueous solution of an intermediate of a cross-linked amine compound.

Into the same reaction vessel as used in Synthesis Example 6, were charged 180.6 g of the aqueous solution of the intermediate of cross-linked amine compound and 0.77 g of water. Thereto, while keeping the inner temperature at from 65 to 75° C., was slowly added dropwise 6.76 g (0.075 mol) of an 80% by weight aqueous solution of acrylic acid over 5 minutes. After the completion of the dropwise addition, the reaction was continued further for about 4 hours at an inner temperature from 65 to 75° C. to obtain an aqueous solution of a cross-linked amine compound having a nonvolatile component content of 45.1%, pH of 9.7 and a viscosity of 3660 mPa·s.

Synthesis Example 8

A solution was prepared by mixing 191.7 g (1.042 mol) of bisphenol A diglycidyl ether having an epoxy equivalent of 184.0 g/eq. and 180 g of acetone. Total amount of the obtained solution was 371.7 g.

Into the same reaction vessel as used in Synthesis Example 6 were charged 129.2 g (1.0 mol) of N-(2-aminoethyl)piperazine and 138.2 g of methanol. Thereto, while keeping the inner temperature at from 84 to 54° C., 285.4 g of the solution obtained above was slowly added dropwise over 5 hours. After the completion of the dropwise addition, the reaction was continued further for 4 hours at an inner temperature from 48 to 54° C. Then, after the reflux condenser was substituted by a Liebig condenser, the inner temperature was raised up to 120° C. while extracting acetone and methanol out of the system. Then, the mixture was cooled while adding 339.9 g of water gradually to obtain 637.8 g of an aqueous solution of an intermediate of a cross-linked amine compound.

Into the same reaction vessel as used in Synthesis Example 6, was charged 127.6 g of he aqueous solution of the intermediate of cross-linked amine compound. Thereto, while keeping the inner temperature at from 65 to 75° C., was slowly added dropwise 3.6 g (0.04 mol) of an 80% by weight aqueous solution of acrylic acid over 5 minutes After the completion of the dropwise addition, the reaction was continued further for about 4 hours at an inner temperature from 65 to 75° C. to obtain an aqueous solution of a cross-linked amine compound having a nonvolatile component content of 44.4%, pH 9.7 and a viscosity of 1049 mPa·s.

Synthesis Example 9

Into the same reaction vessel as used in Synthesis Example 6, were charged 180.6 g of the aqueous solution of the intermediate of cross-linked amine compound obtained in Synthesis Example 7 and 13.8 g of water. Thereto, while keeping the inner temperature at from 65 to 75° C., was slowly added dropwise 7.2 g (0.075 mol) of chloro acetic acid over 5 minutes. After the completion of the dropwise addition, the reaction was continued further for about 4 hours at an inner temperature from 65 to 75° C. to obtain an aqueous solution of a cross-linked amine compound having a nonvolatile component content of 45.3 %, pH of 8.2 and a viscosity of 3740 mPa·s.

Reference Example 1

Into the same reaction vessel as used in Synthesis Example 1 were charged 1237.9 g (12 mol ) of diethylenetriamine and 720.8 g (12 mol) of urea at 80° C. and after the mixture was heated up to 145 to 155° C., the mixture was heated at the same temperature to 2 hours. Then, the mixture was cooled to obtain 1536.0 g of a reaction product mainly composed of 1-(2-aminoethyl)-2-imidazolidinone. This reaction product is virtually nonvolatile at an ordinary temperature.

Example 1

51.3 g of a 63.8% aqueous solution of the cross-linked amine compound obtained in Synthesis Example 1, 49.1 g of the reaction product mainly composed of 1-(2-aminoethyl)-2-imidazolidinone obtained in Reference Example 1 and 33.8 g of water were mixed, then, fully stirred to obtain a cross-linked amine-containing water dispersion having an effective component content of 61%, pH of 13.0 and a viscosity of 505 mPa·s. This is referred to as Resin composition A.

Example 2

79.2 g of a 63.8% aqueous solution of the cross-linked amine compound obtained in Synthesis Example 1, 50.5 g of the reaction product mainly composed of 1-(2-aminoethyl)-2-imidazolidinone obtained in Reference Example 1 and 36.0 g of water were mixed, then, fully stirred to obtain a cross-linked amine-containing aqueous solution having an effective component content of 61%, pH of 13.0 and a viscosity of 1,250 mPa·s. This is referred to as Resin composition B.

Example 3

80.0 g of a 63.8% aqueous solution of the cross-linked amine compound obtained in Synthesis Example 1, 34.9 g of the reaction product mainly composed of 1-(2-aminoethyl)-2-imidazolidinone obtained in Reference Example 1 and 26.1 g of water were mixed, then, fully stirred to obtain a cross-linked amine-containing aqueous solution having an effective component content of 61%, pH of 12.8 and a viscosity of 2,768 mPa·s. This is referred to as Resin composition C.

Example 4

101.3 g of a 39.9% aqueous solution of the cross-linked amine compound obtained in Synthesis Example 2, 94.3 g of urea and 68.6 g of water were mixed, then, fully stirred to obtain a cross-linked amine-containing aqueous solution having an effective component content of 51%, pH of 12.3 and a viscosity of 17 mPa·s. This is referred to as Resin composition D.

Example 5

80.9 g of a 39.9% aqueous solution of the cross-linked amine compound obtained in Synthesis Example 2, 129.1 g of urea and 106.4 g of water were mixed, then, fully stirred to obtain a cross-linked amine-containing aqueous solution having an effective component content of 51%, pH of 12.3 and a viscosity of 10 mPa·s. This is referred to as Resin composition E.

Example 6

100.4 g of a 41.8% aqueous solution of the cross-linked amine compound obtained in Synthesis Example 3, 98.0 g of urea and 76.0 g of water were mixed, then, fully stirred to obtain a cross-linked amine-containing aqueous solution having an effective component content of 51%, pH of 12.1 and a viscosity of 18 mPa·so. This is referred to as Resin composition F.

Example 7

85.8 g of a 41.8% aqueous solution of the cross-linked amine compound obtained in Synthesis Example 3, 143.4 g of urea, and 122.3 g of water were mixed, then, fully stirred to obtain a cross-linked amine-containing aqueous solution having an effective component content of 51%, pH of 12.1 and a viscosity of 10 mPa·s. This is referred to as Resin composition G.

Example 8

97.5 g of a 42.7% aqueous solution of the cross-linked amine compound obtained in Synthesis Example 4, 97.1 g of urea and 77.4 g of water were mixed, then, fully stirred to obtain a cross-linked amine-containing aqueous solution having an effective component content of 51%, pH of 12.1 and a viscosity of 23 mPa·s. This is referred to as Resin composition H.

Example 9

71.3 of a 42.7% aqueous solution of the cross-linked amine compound obtained in Synthesis Example 4, 121.7 g of urea and 105.4 g of water were mixed then, fully stirred to obtain a cross-linked amine-containing aqueous solution having an effective component content of 51%, pH of 12.0 and a viscosity of 10 mPa·s. This is referred to as Resin composition I.

Example 10

129.3 g of an aqueous solution of the cross-linked amine compound obtained in Synthesis Example 5, 116.8 g of urea and 81.0 g of water were mixed, then fully stirred to obtain a cross-linked amine-containing aqueous solution having an effective component content of 51%, pH of 12.0 and a viscosity of 17.5 mPa·s. This is referred to as Resin composition J.

Example 11

100.0 g of a 45.3 % aqueous solution of the cross-linked amine compound obtained in Synthesis Example 6, 181.2 g of the reaction product mainly composed of 1-(2-aminoethyl)-2-imidazolidinone obtained in Reference Example 1 and 271.2 g of water were mixed, then, fully stirred to obtain a cross-linked amine-containing aqueous solution having an effective component content of 41%, pH of 10.5 and a viscosity of 62.5 mPa·s. This is referred to as Resin composition K.

Example 12

100.0 g of a 45.3 % aqueous solution of the cross-linked amine compound obtained in Synthesis Example 6, 105.7 q of the reaction product mainly composed of 1-(2-aminoethyl)-2-imidazolidinone obtained in Reference Example 1 and 162.6 g of water were mixed, then, fully stirred to obtain a cross-linked amine-containing aqueous solution having an effective component content of 41%, pH of 10.7 and a viscosity of 78.3 mPa·s. This is referred to as Resin composition L.

Example 13

100.0 g of a 45.3% aqueous solution of the cross-linked amine compound obtained in Synthesis Example 6, 68.0 g of the reaction product mainly composed of 1-(2-aminoethyl)-2-imidazolidinone obtained in Reference Example 1 and 108.3 g of water were mixed, then, fully stirred to obtain a cross-linked amine-containing aqueous solution having a effective component content of 41% pH of 11.0 and a viscosity of 98.8 mPa·s. This is referred to as Resin composition M.

Example 14

97.2 g of a 45.1% aqueous solution of the cross-linked amine compound obtained in Synthesis Example 7, 167.8 g of urea and 246.6 g of water were mixed, then, fully stirred to obtain a cross-linked amine-Containing aqueous solution having an effective component content of 41%, pH of 10.0 and a viscosity of 10.0 mPa·s. This is referred to as Resin composition N.

Example 15

100.0 g of a 45.1% aqueous solution of the cross-linked amine compound obtained in Synthesis Example 7, 100.8 g of urea and 150.4 g of water were mixed, then, fully stirred to obtain a cross-linked amine-containing aqueous solution having an effective component content of 51%, p H of 10.3 and a viscosity of 11.0 mPa·s. This is referred to as Resin composition O.

Example 16

53.3 g of a 44.4% aqueous solution of the cross-linked amine compound obtained in Synthesis Example 8, 85.7 g of urea and 122.2 g of water were mixed, then, fully stirred to obtain a cross-linked amine-containing aqueous solution having an effective component content of 41%, H of 10.0 and a viscosity of 9 mPa·s. This is referred to as Resin composition P.

Example 17

62.0 g of a 44.4% aqueous solution of the cross-linked amine compound obtained in Synthesis Example 8, 58.14 g of urea and 82.4 g of water were mixed, then, fully stirred to obtain a cross-linked amine-containing aqueous solution having an effective component content of 41%, pH of 10.2 and a viscosity of 10.0 mPa·s. This is referred to as Resin composition Q.

Example 18

100.0 g of a 45.3% aqueous solution of the cross-linked amine compound obtained in Synthesis Example 9, 181.2 g of urea and 271.2 g of water were mixed, then, fully stirred to obtain a cross-linked amine-containing aqueous solution having an effective component content of 41%, pH of 8.6 and a viscosity of 10.0 mPa·s. This is referred to as Resin composition R.

Example 19

81.6 g of a 45.3% aqueous solution of the cross-linked amine compound obtained in Synthesis Example 9, 86.3 g of urea and 132.7 g of water were mixed, then, fully stirred to obtain a cross-linked Amine-containing aqueous solution having an effective component content of 41%, pH of 8.8 and a viscosity of 12.0 mPa·s. This is referred to as Resin composition S.

In the following examples, coating compositions for paper were prepared using the cross-linked amine-containing compositions obtained in the above examples and evaluated.

Examples 20 to 37 and

Controls 1 to 2

An aqueous master color having a composition shown in Table 1 and a solid content of 64.5% was prepared.

TABLE 1

| Composition of master color | |
|---|---|
| Name of component | Solid ratio |
| Piqment *1 | 100 parts |
| Dispersing agent *2 | 0.2 parts |
| Aqueous binder *3 | 15 parts |

*1 Pigment: A mixture of 60 parts of Ultra white 90 (clay manufactured by Engel Hard Minerals, US) and 40 parts of Karbital 90 (calcium carbonate manufactured by Fuji Kaolin Co. Ltd.)
*2 Dispersing agent: Commercially available polyacrylic acid-based pigment dispersing agent
*3 Aqueous binder: A mixture of 11 parts of commercially available styrene-butadiene latex and 4 parts of commercially available oxidized starch Each resin composition obtained in Examples 1 to 9 and Examples 11 to 19 was added to the master color shown in Table 1 so that the solid content therein was 0.6 parts per 100 parts of the pigment in the color master. In Control 1, an aqueous thermosetting polyamide polyurea formaldehyde resin (abbreviated as "PAPU" in the table) solution having an effective component content of 50% produced according to a method described in Example 3 of JP-A-55-11837 (=U.S. Pat. No. 4,246,153) was added instead of the above-described resin composition in the same amount as in Examples 11 to 19. In Control 2, the master color was used as it is, without adding the resin component. Water and a 10% sodium hydroxide solution were added to the mixtures to adjust the concentration and pH thereof to obtain coating compositions having a total solid content of 64%.

Examples 38 and 39

Each of Resin composition A obtained in Example 1 and Resin composition D obtained in Example 4 are mixed with the same commercially available styrene-butadiene latex as that used for preparing the master color in Table 1, so that ratio of the solid content of the resin and the latex is 5/500. The resulting mixed latex is further mixed with the same pigment and the dispersing agent as those used for preparing the master color in Table 1 and an oxidized starch according to the ratio shown in Table 2. Water and a 10% sodium hydroxide solution were added to the mixtures to adjust the concentration and pH thereof to obtain coating compositions having a total solid content of 64%.

TABLE 2

| Composition of master color | |
|---|---|
| Name of component | Solid ratio |
| Pigment | 100 parts |
| Dispersing agent | 0.2 parts |
| Oxidized starch | 4 parts |
| Aqueous binder | 11 parts |

Physical properties of the resulting coating compositions obtained in Examples 20–39 and Controls 1 and 2 were measured by the following methods. Results thereof are shown in Table 3 and 4.

(1) pH:

A glass electrode type hydrogen ion densitometer [manufactured by Toa Denpa Kogyo K. K.] was used. The pH of a coating composition immediately after preparation was measured at 25° C.

(2) Viscosity:

A B-type viscometer [BL type, manufactured by Tokyo Keiki K. K.] was used, and the viscosity of a coating composition immediately after preparation was measured at 25° C. and 60 rpm.

Each of the resulting coating compositions was coated on one surface of highgrade paper having a basis weight of 80 g/m$^2$ using a wire rod so that the coated amount was 14 g/m$^2$. Immediately after the coating, it was dried with hot air at 120° C. for 30 seconds, then, the humidify was controlled for 16 hours at a temperature of 20° C. and a relative humidity of 65%. Thereafter, super calendar treatment was conducted twice under conditions of a temperature of 60° C. and a linear load of 60 kg/cm, to obtain coated paper. Thus obtained coated paper was subjected to tests of water-resistance and ink receiving property, and the results of the tests are shown in Tables 2, 3-1 and 3-2. The test methods are as shown below.

(3) water-resistance; wet pink method (WP method)

RI tester (manufactured by Akari Seisakusho K. K.) was used. The coated surface was moistened by a water-supplying roll and then subjected to printing and paper-pealed condition was observed with naked eyes and evaluated. Determination criterion is as shown below.

Water-resistance (poor) 1 to 5 (excellent)

(4) ink receiving property (4-1) A method

RI tester was used. The coated surface was moistened by a water-supplying roll and then subjected to printing and ink receiving property was observed with naked eyes and evaluated, Determination criterion is as shown below.

Ink receiving property (poor) 1 to 5 (excellent)

(4-2) B method

RI tester was used. Slight clearance was made between metal roll and a rubber roll, and water is poured on this clearance and then, printing was conducted quickly, and ink receiving property was observed with naked eyes and evaluated, Determination criterion is as shown below.

Ink receiving property (poor) 1 to 5 (excellent)

TABLE 3-1

Test results of Examples 20 to 28

| | Example No. | | | | | | | | |
|---|---|---|---|---|---|---|---|---|---|
| | 20 | 21 | 22 | 23 | 24 | 25 | 26 | 27 | 28 |
| Resin composition used | A | B | C | D | E | F | G | H | I |
| Physical property of coating composition | | | | | | | | | |
| pH | 10.0 | 9.9 | 9.9 | 9.6 | 9.6 | 9.6 | 9.5 | 9.6 | 9.5 |
| Viscosity (mPa · s) | 2800 | 2760 | 2890 | 2450 | 2260 | 2600 | 2460 | 2450 | 2420 |
| Physical properties of coating paper | | | | | | | | | |
| Water-resistance: WP method | 4.6 | 4.7 | 4.7 | 4.6 | 4.0 | 4.4 | 4.1 | 4.4 | 4.1 |
| Ink receiving property: A method | 4.7 | 4.7 | 4.7 | 4.4 | 4.2 | 4.2 | 4.0 | 4.2 | 4.0 |
| Ink receiving property: B method | 4.2 | 4.2 | 4.2 | 4.7 | 4.8 | 4.6 | 4.5 | 4.7 | 4.7 |

TABLE 3-2

Test results of Examples 29 to 37

| | Example No. | | | | | | | | |
|---|---|---|---|---|---|---|---|---|---|
| | 29 | 30 | 31 | 32 | 33 | 34 | 35 | 36 | 37 |
| Resin composition used | K | L | M | N | O | P | Q | R | S |
| Physical property of coating composition | | | | | | | | | |
| pH | 9.6 | 9.7 | 9.8 | 9.4 | 9.4 | 9,4 | 9.4 | 9.2 | 9.1 |
| Viscosity (mPa · s) | 2800 | 2860 | 2890 | 2180 | 2250 | 2210 | 2290 | 2380 | 2470 |
| Physical properties of coated paper | | | | | | | | | |
| Water-resistance: WP method | 4.6 | 4.8 | 4.9 | 4.6 | 4.8 | 4.6 | 4.8 | 4.6 | 4.8 |
| Ink receiving property: A method | 4.5 | 4.5 | 4.6 | 4.5 | 4.6 | 4.6 | 4.8 | 4.6 | 4.8 |
| Ink receiving property: B method | 4.2 | 4.6 | 4.9 | 4.4 | 4.6 | 4.4 | 4.8 | 4.6 | 4.7 |

TABLE 4

Test results of Examples 38 and 39 and Controls 1 to 2

| | Example | | Control | |
|---|---|---|---|---|
| No. | 38 | 39 | 1 | 2 |
| Kind of resin | A | D | PAPU | — |
| Physical property of coating composition | | | | |
| pH | 9.9 | 9.6 | 9.2 | 9.2 |
| Viscosity (mPa · s) | 2760 | 2380 | 2080 | 2060 |
| Physical properties of coated paper | | | | |
| Water-resistance: WP method | 4.5 | 4.5 | 2.4 | 1.3 |
| Ink receiving property: A method | 4.6 | 4.4 | 3.0 | 1.5 |
| Ink receiving property: B method | 4.2 | 4.6 | 3.0 | 1.5 |

Examples 40 and 41 and

Controls 3 to 4

An aqueous master color having a composition shown in Table 1 and a solid content of 64.5 % was prepared.

Each resin composition obtained in Examples 5 and 10 was added to the master color shown in Table 1 so that the solid content therein was 0.2 parts per 100 parts of the pigment in the color master. In Control 3, an aqueous thermosetting polyamide polyurea formaldehyde resin (abbreviated as "PAPU" in the table) solution having an effective component content of 50% produced according to a method described in Example 3 of JP-A-55-31837 (=U.S. Pat. No. 4,246,153) was added instead of the above-described resin composition so that the solid content therein was 0.6 parts per 100 parts of the pigment in the color master. In Control 4, the master color was used as it is without adding the resin component. Water and a 10% sodium hydroxide solution were added to the mixtures to adjust the concentration and pH thereof to obtain coating compositions having a total solid content of 64%.

Each of the resulting coating compositions was coated on one surface of high-grade paper having a basis weight of 80 g/m$^2$ using a wire rod so that the coated amount was 14 g/m$^2$. Immediately after the coating, it was dried with hot air at 120° C. for 30 seconds, then, the humidity was controlled for 16 hours at a temperature of 20° C. and a relative humidity of 65%. Thereafter, super calendar treatment was conducted twice under conditions of a temperature of 60° C. and a linear load of 60 kg/cm, to obtain coated paper. Thus obtained coated paper was subjected to tests of water-resistance and ink receiving property, and the results of the tests are shown in Table 5. The test methods of water-resistance and ink receiving property are as shown above and the test methods of white paper gloss and printed paper gloss are as shown below.

(5) white paper gloss Gw

Using a digital photometer "GM-26D" (manufactured by Murakami color technology laboratory), positive reflection light intensity (%) of the coated paper at the angle of reflection of 75°–75° was measured.

(6) Printed paper gloss Gp

Using RI tester, overlap printing was conducted twice on the coated paper. Using a digital photometer "GM-26D" (the same photometer as that used in (3)), positive reflection light intensity (%) of the printed portion of the coated paper at the angle of reflection of 60°–60° was measured. The larger is the amount of Gp, the superior is the printed paper gloss.

(7) Gloss Difference ΔG

Gloss Difference ΔG is the difference of White paper gloss and Printed paper gloss, i,e. Gp–Gw. The larger is ΔG, the larger is difference of the gloss at the printed portion and the gloss at non-printed portion, The large difference enables the printing with high contrast.

TABLE 5

Test results of Examples 40 and 41 and Controls 3 to 4

| No. | Example | | Control | |
|---|---|---|---|---|
| | 40 | 41 | 3 | 4 |
| Kind of resin | E | J | PAPU | — |
| Physical properties of coated paper | | | | |
| Water-resistance: WP method | 2.7 | 3.3 | 2.8 | 1.4 |
| Ink receiving property: A method | 3.3 | 4.3 | 3.0 | 1.5 |
| Ink receiving property: B method | 3.8 | 4.3 | 3.0 | 1.5 |
| Gw | 75.3 | 75.6 | 75.8 | 75.5 |
| Gp | 78.4 | 79.4 | 77.5 | 78.0 |
| ΔG | 3.1 | 3.8 | 1.7 | 2.5 |

The white paper glosses of Example 40, Example 41, Control 3 and Control 4 show very little difference each other. ΔG of Control 3, in which a known polyamide-polyurea-formaldehyde resin was used, is smaller than ΔG of Control 4, in which no resin component was compounded. On the other hand, ΔG of Example 40 and Example 41, examples of the present invention, are much larger than that of Control 4. In addition, Example 40 and Example 41, particularly Example 41, gave much improved ink-receiving properties.

The coated paper of the present invention does not contain a formaldehyde-derived component. The coated paper of the present invention does not generate formaldehyde.

The Coated paper of the present invention is excellent in ink receiving property and water-resistance, and the gloss of the coated paper is little deteriorated or even improved comparing to a coated paper produced by using a coating composition not containing a resin component.

Synthesis Example 10

Into a four-necked flask equipped with a thermometer, reflux condenser and stirring rod were charged 646 g (5.0 mol) of N-(2-aminoethyl)piperazine and 690 g of methanol. The inner temperature was maintained at from 45 to 55° C., and to this was slowly added dropwise a solution prepared previously by mixing 807 g (2.4 mol of bisphenol A diglycidyl ether and 759 g of acetone. After the completion of the dropwise addition, the reaction was continued further for 4 hours at an inner temperature from 45 to 55° C. Then, after the reflux condenser was substituted by a Liebig condenser, the inner temperature was raised up to 80° C. and the inner pressure was reduced to 21 kPa, while extracting acetone and methanol out of the system. Then, the inner pressure was raised to the atmospheric pressure and the mixture was cooled while adding 1692 g of water gradually to obtain an aqueous solution of a cross-linked amine compound having a nonvolatile component content of 39.6%, pH of 11.9 and a viscosity of 839 mPa·s (about 5,000 mPa·s in terms of 50% concentration). This is referred to as cross-linked amine aqueous solution X.

Synthesis Example 11

Into the same reaction vessel as used in synthesis Example 6 were charged 426 g (3.3 mol) of N-(2-aminoethyl)piperazine and 517 g of methanol. The inner temperature was maintained at from 45 to 55° C., and to this was slowly added dropwise a solution prepared previously by mixing 638 g (1.9 mol) of bisphenol A diglycidyl ether and 543 g of acetone. After the completion of the dropwise addition, the reaction was continued further for 4 hours at an inner temperature from 45 to 55° C. Then, after the reflux condenser was substituted by a Liebig condenser, the inner temperature was raised up to 120° C. while extracting acetone and methanol out of the system. Then, the mixture was cooled while adding 1286 g of water gradually to obtain an aqueous solution of a cross-linked amine compound having a nonvolatile component content of 41.8%, pH of 11.8 and a viscosity of 2420 mPa·s (about 9,000 mPa·s in terms of 50% concentration). This is referred to as cross-linked amine aqueous solution Y.

Examples 42 to 48 and

Controls 5 to 6

In Example 42, 25.3 parts of the cross-linked amine aqueous solution X prepared in Synthesis Example 10, 40 parts of triethylene glycol and 32.8 parts of water were mixed, then, fully stirred to obtain an aqueous solution of resin composition having an effective component content of 51%. Similarly, in Examples 43 to 48, the cross-linked amine aqueous solution, polyhydric alcohol and, in some Examples, urea were mixed, according to the compounding amount as shown in Table 6, and the concentration was adjusted by adding water to obtain an aqueous solution of resin composition having an effective component content of 51%.

An aqueous master color having a composition shown in Table 1 and a solid content of 64.5 and pH of 9.2 was prepared.

Each resin composition obtained in Examples 42 to 48 was added to the master color shown in Table 1 so that the solid content therein was 0.6 parts per 100 parts of the pigment in the color master. In Control 5, an aqueous thermosetting polyamide polyurea formaldehyde resin (abbreviated as "PAPU" in the table) solution having an effective component content of 50% produced according to a method described in Example 3 of JP-A-55-31837 (=U.S. Pat. No. 4,246,153) was added instead of the above-described resin composition in the same amount as in Examples 42 to 48. In Control 6, the master color was used as it is, without adding the resin component. Water was added to the mixtures to adjust the concentration thereof to obtain coating compositions having a total solid content of 64%. The pH and viscosity of each coating composition was measured according to the above-mentioned method, and the results are shown in Table 6.

Each of the resulting coating compositions was coated on one surface of high-grade paper having a basis weight of to 80 g/m² using a wire rod so that the coated amount was 14 g/m². Immediately after the coating, it was dried with hot air at 120° C. for 30 seconds, then, the humidity was controlled for 16 hours at a temperature of 20° C. and a relative humidity of 65%. Thereafter, super calendar treatment was conducted twice under conditions of a temperature of 60° C. and a linear load of 60 kg/cm, to obtain coated paper. Thus obtained coated paper was subjected to tests of water-resistance and ink receiving property, and the results of the test are shown in Table 6. The test methods of water-resistance and ink receiving property are as shown above.

TABLE 6

Test results of Evaluation Examples 42 to 48 and Controls 5 to 6

| | Example No. | | | | |
| --- | --- | --- | --- | --- | --- |
| | 42 | 43 | 44 | 45 | 46 |
| Cross-linked amine aqueous solution used | X | X | X | Y | Y |
| Amount (parts) | 25.3 | 25.3 | 25.3 | 23.9 | 23.9 |
| Polyhydric alcohol *1 | TEG | DEG | SOL | DEG | DEG |
| Amount (parts) | 40 | 10 | 20 | 40 | 10 |
| Urea | — | 30 | 20 | — | 30 |
| Resin used in Control | | | | | |
| Physical property of coating composition | | | | | |
| pH | 9.4 | 9.4 | 9.4 | 9.4 | 9.4 |
| Viscosity (mPa · s) | 2700 | 2560 | 2620 | 2580 | 2440 |
| Physical properties of coated paper | | | | | |
| Water-resistance: WP Method | 4.5 | 4.6 | 4.5 | 4.4 | 4.4 |
| Ink receiving property: A method | 4.6 | 4.7 | 4.6 | 4.2 | 4.2 |
| Ink receiving property: B method | 4.6 | 4.6 | 4.6 | 4.4 | 4.5 |

TABLE 6-continued

Test results of Evaluation Examples 42 to 48 and Controls 5 to 6

| | Example | | Control | |
| --- | --- | --- | --- | --- |
| No. | 47 | 48 | 5 | 6 |
| Cross-linked amine aqueous solution used | Y | Y | | |
| Amount (parts) | 23.9 | 23.9 | | |
| Polyhydric alcohol *1 | TMP | SOL | | |
| Amount (parts) | 20 | 10 | | |
| Urea | 20 | 30 | | |
| Resin used in Control | | | PAPU | |
| Physical property of coating composition | | | | |
| pH | 9.4 | 9.4 | 9.1 | 9.2 |
| Viscosity (mPa · s) | 2480 | 2400 | 2080 | 2100 |
| Physical properties of coated paper | | | | |
| Water-resistance: WP method | 4.4 | 4.6 | 2.6 | 1.7 |
| Ink receiving property: A method | 4.2 | 4.3 | 3.0 | 1.5 |
| Ink receiving property: B method | 4.4 | 4.4 | 3.0 | 1.5 |

*1 Polyhydric alcohol
TEG: Triethylene glycol
DEG: Diethylene glycol
SOL: Sorbitol
TMP: Trimethylol propane The resin composition for paper-coating of the present invention does not contain a formaldehyde-derived component. Therefore, a coating composition for paper comprising the resin composition does not generate formaldehyde.

The resin composition for paper-coating of the present invention can be prepared in the form of a solution or a dispersion in a liquid medium, such as a mixture of water and an organic solvent and substantially water alone, which can be mixed with a pigment and an aqueous binder to prepare a coating composition for paper. The coating composition for paper does not tend to cause disadvantage such as thickening, deterioration in flowing property, and the like.

The coating composition for paper comprising the resin composition provides a coated paper manifesting various improved abilities such as excellent ink receiving property and water-resistance, and the like.

What is claimed is:

1. A resin composition for paper-coating which comprises
   (A) a cross-linked amine compound which is a reaction product of (a) an aliphatic amine and (b) a glycidyl compound having at least two glycidyl groups in the molecule, or
      a reaction product of (a) an aliphatic amine, (b) a glycidyl compound having at least two glycidyl groups in the molecule and (c) a compound selected from α,β-unsaturated carbonyl compounds α,β-unsaturated nitrile compounds and α-halocarboxylic acid groups; and
   (B) at least one selected from the group consisting of (B1) ammonium chloride, sodium chloride, calcium chloride, ammonium chloride, ammonium sulfate, sodium sulfate, ammonium sulfate, ureas, and saccharides.

2. A resin composition for paper-coating which comprises
(A) a cross-linked amine compound which is a reaction product of (a) an aliphatic amine and (b) a glycidyl compound having at least two glycidyl groups in the molecule; and
(B) at least one selected from the group consisting of (B1) ammonium chloride, sodium chloride, calcium chloride, ammonium chloride, ammonium sulfate, sodium sulfate, ammonium sulfate, ureas, and saccharides.

3. A resin composition for paper-coating which comprises
(A) a cross-linked amine compound which is a reaction product of (a) an aliphatic amine and (b) a glycidyl compound having at least two glycidyl groups in the molecule; and
(B1) at least one selected from the group consisting of ammonium chloride, sodium chloride, calcium chloride, ammonium chloride, ammonium sulfate, sodium sulfate, and ammonium sulfate.

4. A resin composition for paper-coating which comprises
(A) a cross-linked amine compound which is
a reaction product of (a) an aliphatic amine and (b) a glycidyl compound having at least two glycidyl groups in the molecule; and
(B2) a polyhydric alcohol.

5. A resin composition for paper-coating which comprises
(A) a reaction product of (a) an aluphatic amine, (b) a glycidyl compound having at least two glycidyl groups in the molecule and (c) a compound selected from α,β-unsaturated carbonyl compounds α,β-unsaturated nitrile compounds and α-halocarboxylic acid groups; and
(B1) at least one selected from the group consisting of ammonium chloride, sodium chloride, calcium chloride, ammonium chloride, ammonium sulfate, sodium sulfate, and ammonium sulfate.

6. The resin composition according to claim 1, wherein the aliphatic amine (a) is a heterocyclic amine.

7. The resin composition according to claim 6 wherein the heterocyclic amine has at least one primary amino group in addition to a secondary or tertiary amine constituting the heterocycle.

8. The resin composition according to claim 1, wherein the glycidyl compound (b) is an aromatic glycidyl ether.

9. The resin composition according to claim 5 wherein the compound selected from α,β-unsaturated carbonyl compounds, α,β-unsaturated nitrile compounds and α-halocarboxylic acid groups (c) is acrylic acid.

10. The resin composition according to claim 5 wherein the compound selected from α,β-unsaturated carbonyl compounds, α,β-unsaturated nitrile compounds and α-halocarboxylic acid groups (c) is chloro acetic acid.

11. The resin composition according to claim 1, wherein the (B) component is selected from ureas.

12. The resin composition according to claim 1 which is dispersed or dissolved in a liquid medium.

13. The resin composition according to claim 12 wherein the liquid medium is a mixture of water and an organic solvent.

14. The resin composition according to claim 13 wherein the liquid medium substantially consists of water.

15. A coating composition for paper comprising
(C) a pigment;
(D) an aqueous binder,
(A) a cross-linked amine compound which is a reaction product of (a) an aliphatic amine and (b) a glycidyl compound having at least two glycidyl groups in the molecule, or a reaction product of (a) an aliphatic amine, (b) a glycidyl compound having at least two glycidyl groups in the molecule and (c) a compound selected from α,β-unsaturated carbonyl compounds α,β-unsaturated nitrile compounds and α-halocarboxylic acid groups; and
(B) at least one selected from the group consisting of ammonium chloride, sodium chloride, calcium chloride, ammonium chloride, ammonium sulfate, sodium sulfate, ammonium sulfate, ureas, and saccharides.

16. A coated paper which comprises (1) a paper substrate and (2) a coat on the surface of the paper substrate comprising
(C) a pigment,
(D) an aqueous binder;
(A) a cross-linked amine compound which is a reaction product of (a) an aliphatic amine and (b) a glycidyl compound having at least two glycidyl groups in the molecule, or a reaction product of (a) an aliphatic amine, (b) a glycidyl compound having at least two glycidyl groups in the molecule and (c) a compound selected from α,β-unsaturated carbonyl compounds α,β-unsaturated nitrile compounds and α-halocarboxylic acid groups; and
(B) at least one selected from the group consisting of ammonium chloride, sodium chloride, calcium chloride, ammonium chloride, ammobium sulfate, sodium sulfate, ammonium sulfate, ureas, and saccharides.

17. The coated paper according to claim 16 wherein the aliphatic amine is a heterocyclic amine.

18. The coated paper according to claim 17 wherein the heterocyclic amine has at least one primary amino group in addition to a secondary or tertiary amine constituting the heterocycle.

19. The coated paper according to claim 16 wherein the glycidyl compound (b) is an aromatic glycidyl ether.

20. The coated paper according to claim 16 wherein (B) component is selected from ureas.

* * * * *